(12) United States Patent
Sugita

(10) Patent No.: US 9,465,203 B2
(45) Date of Patent: Oct. 11, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

(*) Notice: Subject to any disclaimer, the term of this patent is extended or adjusted under 35 U.S.C. 154(b) by 75 days.

(21) Appl. No.: 14/527,573

(22) Filed: Oct. 29, 2014

(65) Prior Publication Data

US 2015/0146044 A1    May 28, 2015

(30) Foreign Application Priority Data

Nov. 22, 2013  (JP) ................. 2013-241733

(51) Int. Cl.
   *G02B 15/14*      (2006.01)
   *G02B 15/173*     (2006.01)

(52) U.S. Cl.
   CPC .................. *G02B 15/173* (2013.01)

(58) Field of Classification Search
   CPC ............................................. G02B 15/173
   USPC ................................................ 359/676, 684
   See application file for complete search history.

(56) References Cited

U.S. PATENT DOCUMENTS

2013/0120640 A1* 5/2013 Taki ............... G02B 15/14
                                                348/345

FOREIGN PATENT DOCUMENTS

| JP | H10-206736 A | 8/1998 |
| JP | H11-174324 A | 7/1999 |
| JP | 2004-317867 A | 11/2004 |
| JP | 2009-168934 A | 7/2009 |
| JP | 2011-180218 A | 9/2011 |

* cited by examiner

*Primary Examiner* — James Jones
(74) *Attorney, Agent, or Firm* — Carter, DeLuca, Farrell & Schmidt, LLP

(57) ABSTRACT

Provided is a zoom lens, including, in order from object side to image side: first and second lens units having positive and negative powers, respectively; and three or more lens units. An interval between adjacent ones of the lens units is changed during zooming. An N-th lens unit, where 5≤N holds, counted from object side has negative refractive power, and moves to image side during focusing from infinite object to a close distance object. The N-th lens unit includes, in order from object side to image side, negative, positive, negative, and positive lenses. A focal length ($f_N$) of N-th lens unit, a focal length ($f_T$) of an entire system at telephoto end, a distance ($o_{1N}$) from a surface vertex of N-th lens unit on object side to a front principal point position of N-th lens unit, and a length ($d_N$) on optical axis of N-th lens unit are appropriately set.

13 Claims, 13 Drawing Sheets

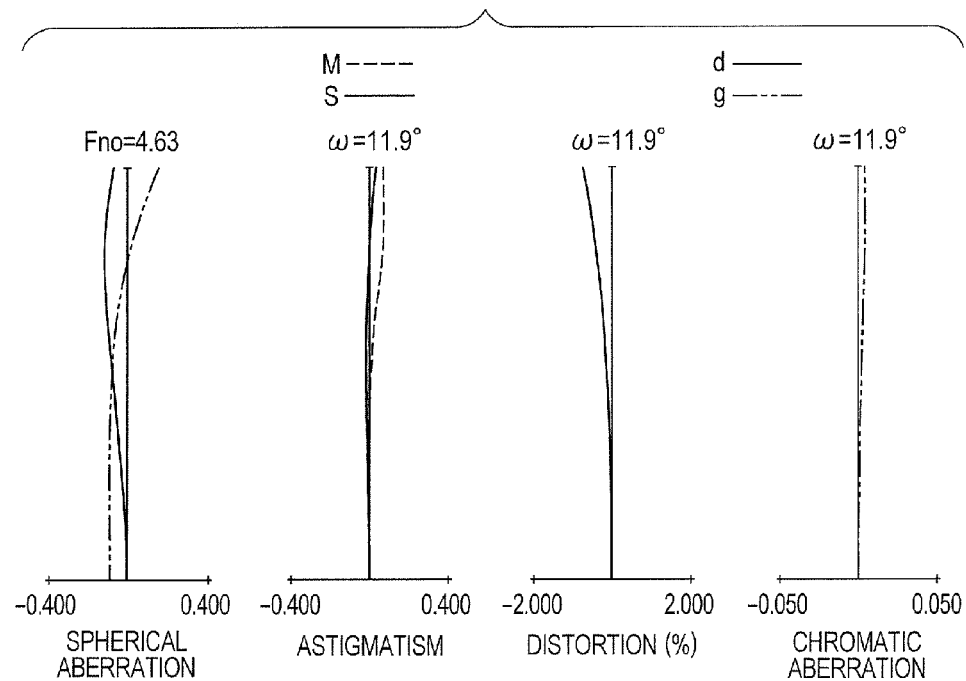
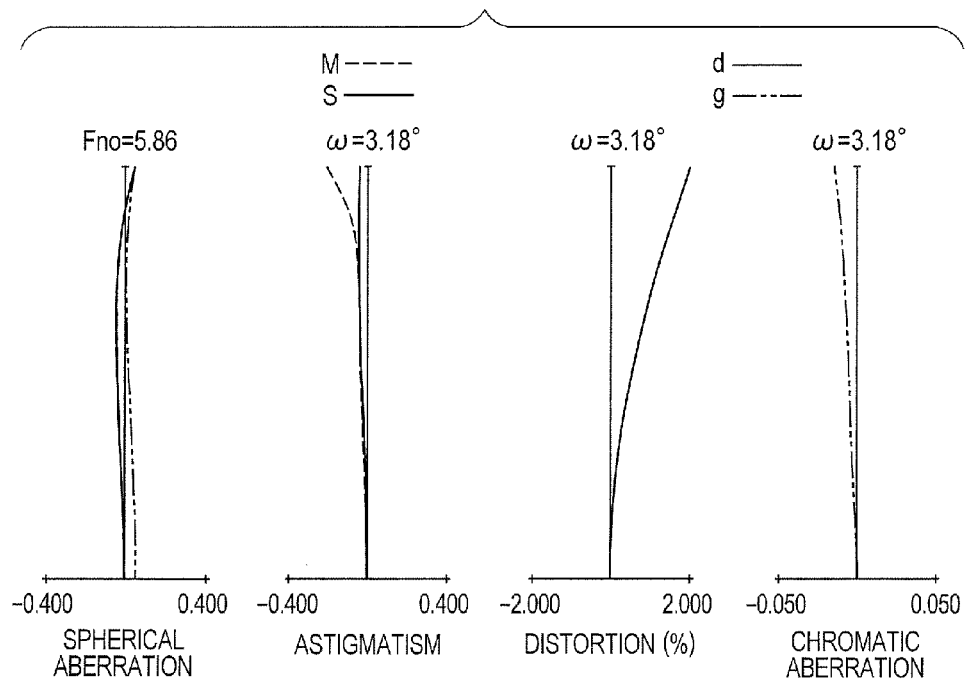

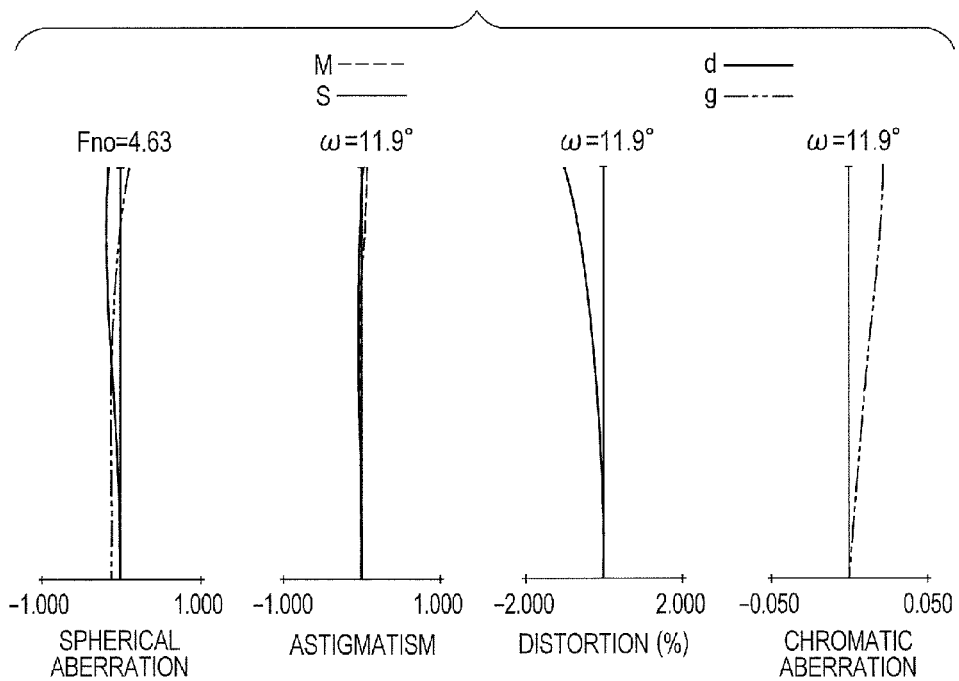
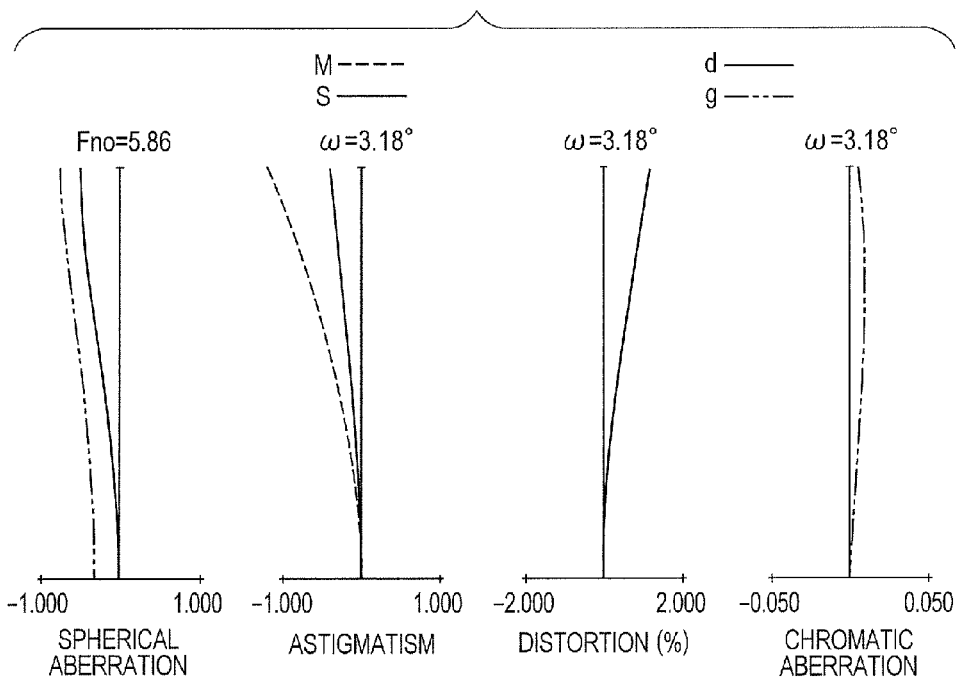

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitably used for an image pickup apparatus such as a video camera, a digital still camera, a monitoring camera, a film camera, and a broadcasting camera.

2. Description of the Related Art

It is required for a zoom lens to be used in an image pickup apparatus to have a high zoom ratio and a small size. A positive lead type zoom lens including five or more lens units in which a lens unit having a positive refractive power is arranged closest to an object side is known as a small-sized zoom lens having a high zoom ratio. In addition, a rear focus type zoom lens is known as a zoom lens with which an entire optical system is relatively easily downsized. In the rear focus type zoom lens, lens units other than a first lens unit are configured to move in an optical axis direction, to thereby carry out focusing.

In addition, in recent years, a zoom lens has been demanded to achieve high-speed autofocus, a so-called full-time manual operation in which autofocus and manual focus are used together in real time, and the like.

As a zoom lens for realizing such demands, there is known a zoom lens including, in order from an object side to an image side, first to fifth lens units respectively having positive, negative, positive, positive, and negative refractive powers. In Japanese Patent Application Laid-Open No. H10-206736 and Japanese Patent Application Laid-Open No. 2009-168934, there is disclosed a zoom lens in which zooming is carried out by moving lens units and focusing is carried out by moving a fifth lens unit. In addition, a six-unit zoom lens is known, which includes, in order from an object side to an image side, first to sixth lens units respectively having positive, negative, positive, negative, positive, and negative refractive powers.

In Japanese Patent Application Laid-Open No. H11-174324, there is disclosed a zoom lens which carries out focusing from infinity to a short distance by moving a first lens unit to an object side. In addition, there is also disclosed a zoom lens which carries out focusing by moving a fourth lens unit and a sixth lens unit. In Japanese Patent Application Laid-Open No. 2011-180218, there is disclosed a zoom lens which carries out focusing by moving a sixth lens unit. In addition, there is known a seven-unit zoom lens including, in order from an object side to an image side, first to seventh lens units respectively having positive, negative, positive, negative, positive, negative, and positive refractive powers. In Japanese Patent Application Laid-Open No. 2004-317867, there is disclosed a zoom lens which carries out focusing by moving a sixth lens unit.

In order for a telephoto zoom lens including five or more lens units to easily obtain high-speed focusing and achieve a less aberration variation during focusing and high optical characteristic over an object distance, it becomes important to appropriately set the refractive powers of the lens units.

In addition, it becomes important to appropriately set the refractive powers, the lens structure, and the like of the lens units for focusing. When those structures are not appropriately set, it becomes difficult to carry out focusing at high speed and obtain high optical characteristic over the object distance from the infinity to the short distance.

SUMMARY OF THE INVENTION

A zoom lens according to one embodiment of the present invention includes, in order from an object side to an image side: a first lens unit having a positive refractive power; a second lens unit having a negative refractive power; and three or more lens units, in which an interval between adjacent ones of the lens units is changed during zooming, in which an N-th lens unit, where 5≤N holds, counted from the object side has a negative refractive power, and is configured to move to the image side during focusing from infinite object to a close distance object, the N-th lens unit including, in order from the object side to the image side, a negative lens, a positive lens, a negative lens, and a positive lens, and in which the following conditional expressions are satisfied:

$$-0.15 < f_N/f_T < -0.05; \text{ and}$$

$$-0.30 < o_{1N}/d_N < 0.05,$$

where $f_N$ represents a focal length of the N-th lens unit, $f_T$ represents a focal length of an entire system at a telephoto end, $o_{1N}$ represents a distance from a surface vertex of the N-th lens unit on the object side to a front principal point position of the N-th lens unit, and $d_N$ represents a length on an optical axis of the N-th lens unit.

Further features of the present invention will become apparent from the following description of exemplary embodiments with reference to the attached drawings.

BRIEF DESCRIPTION OF THE DRAWINGS

FIG. 2A is an aberration diagram at the wide angle end (at a short focal length end) at an infinite object distance of the zoom lens according to Example 1 of the present invention.

FIG. 2B is an aberration diagram at a telephoto end (at a long focal distance end) at the infinite object distance of the zoom lens according to Example 1 of the present invention.

FIG. 9A is an aberration diagram at the wide angle end at the object distance of 1 m of the zoom lens according to Example 3 of the present invention.

FIG. 9B is an aberration diagram at the telephoto end at the object distance of 1 m of the zoom lens according to Example 3 of the present invention.

DESCRIPTION OF THE EMBODIMENTS

Preferred embodiments of the present invention will now be described in detail in accordance with the accompanying drawings.

Now, a zoom lens and an image pickup apparatus including the zoom lens according to the present invention are described. The zoom lens according to the present invention includes, in order from an object side to an image side, a first lens unit having a positive refractive power, a second lens unit having a negative refractive power, and at least three lens units. During zooming, an interval between each adjacent two lens units is changed.

Figure 1:
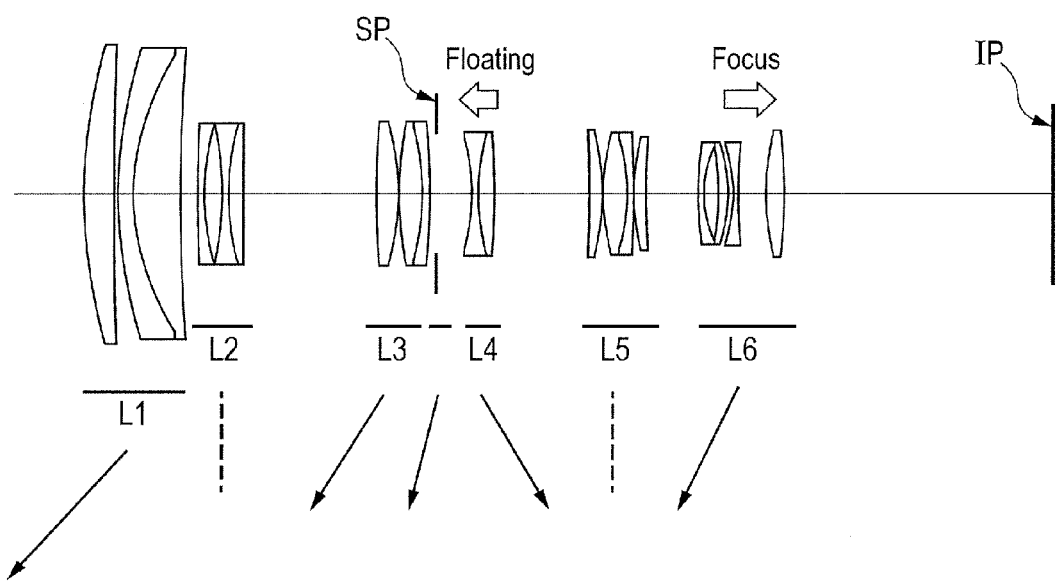
FIG. 1 is a lens cross-sectional view at a wide angle end of a zoom lens according to Example 1 of the present invention.
Figure 3A:
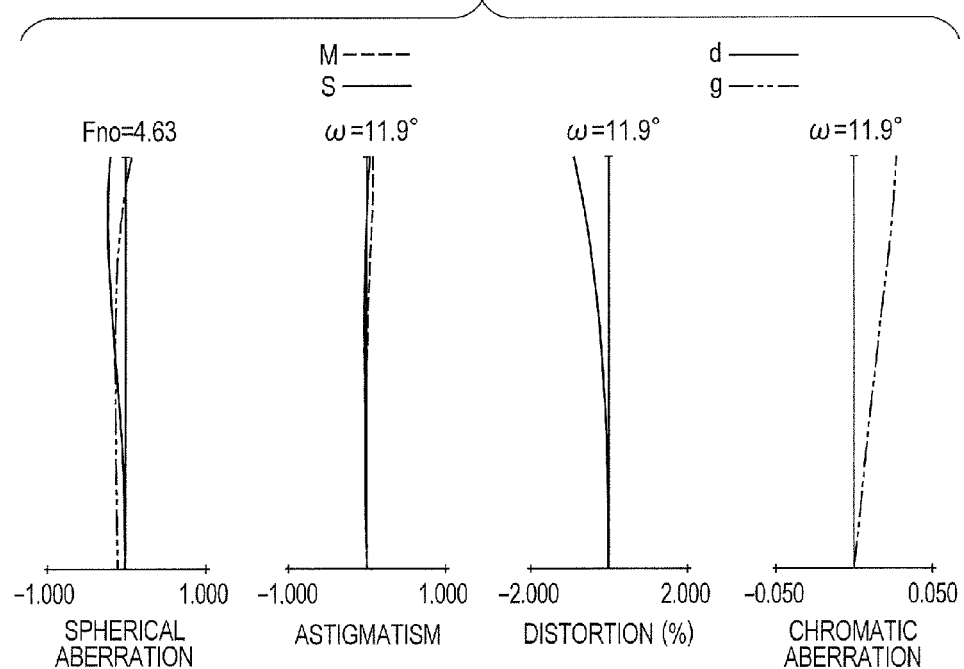
FIG. 3A is an aberration diagram at the wide angle end at the object distance of 1 m (when, in numerical examples which are described later, a size is expressed in units of mm (the same applies to the following)) of the zoom lens according to Example 1 of the present invention.
Figure 3B:
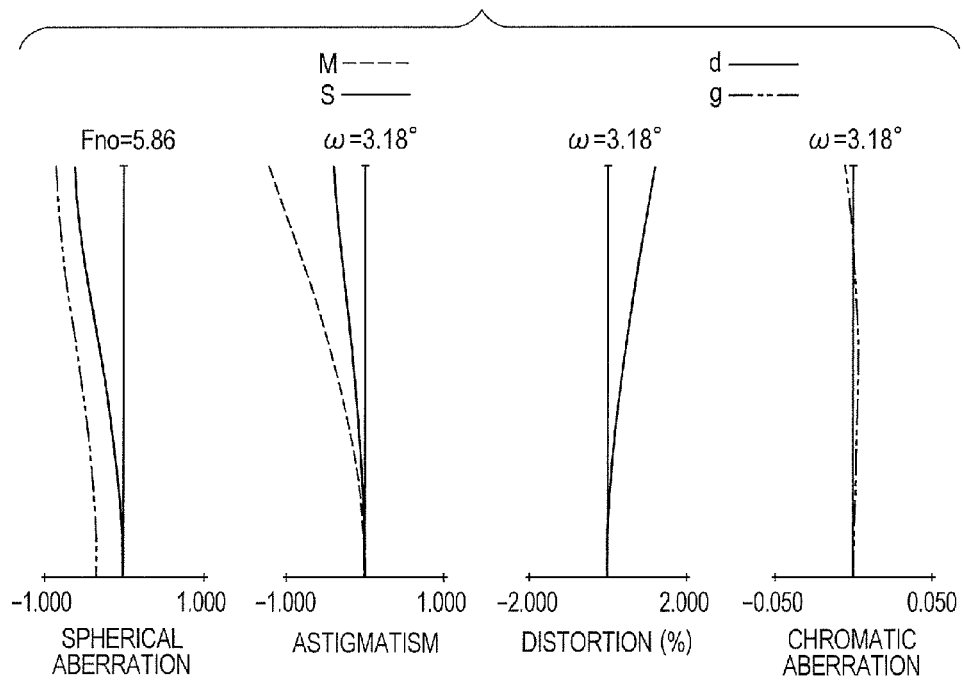
FIG. 3B is an aberration diagram at the telephoto end at the object distance of 1 m of the zoom lens according to Example 1 of the present invention.

FIG. 1 is a lens cross-sectional view at a wide angle end (at a short focal length end) of a zoom lens according to Example 1 of the present invention. FIG. 2A is a longitudinal aberration diagram at a wide angle end when the zoom lens is focused on infinity according to Example 1 of the present invention. FIG. 2B is a longitudinal aberration diagram at a telephoto end (at a long focal length end) when the zoom lens is focused on the infinity according to Example 1 of the present invention. FIG. 3A is a longitudinal aberration diagram at the wide angle end when the zoom lens is focused on an object at an object distance of 1.0 m according to Example 1 of the present invention. FIG. 3B is a longitudinal aberration diagram at the telephoto end when the zoom lens is focused on the object at the object distance of 1.0 m according to Example 1 of the present invention. Example 1 relates to a six-unit zoom lens having a zoom ratio of 3.78 and an F number of 4.63 to 5.86.

Note that, the object distance is a distance from an image plane when, in each of the numerical examples, each of sizes is expressed in units of mm. This entirely applies to the following.

Figure 4:
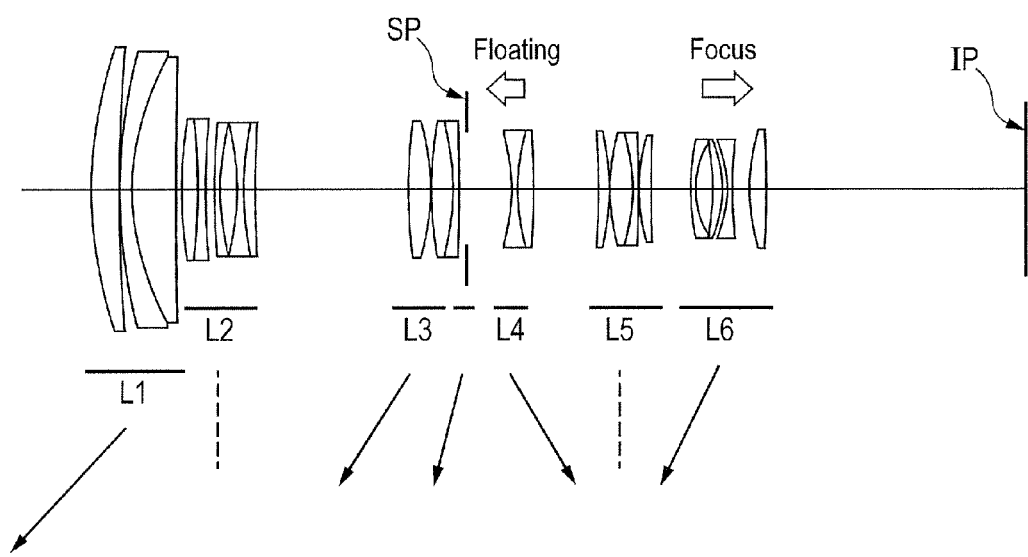
FIG. 4 is a lens cross-sectional view at a wide angle end of a zoom lens according to Example 2 of the present invention.
Figure 5A:
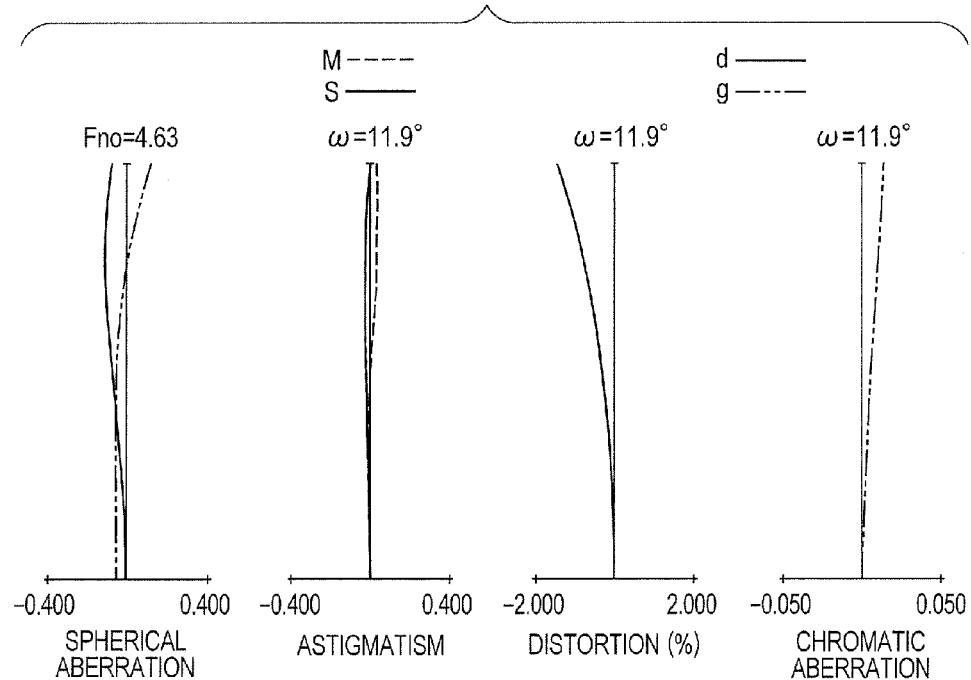
FIG. 5A is an aberration diagram at the wide angle end at an infinite object distance of the zoom lens according to Example 2 of the present invention.
Figure 5B:
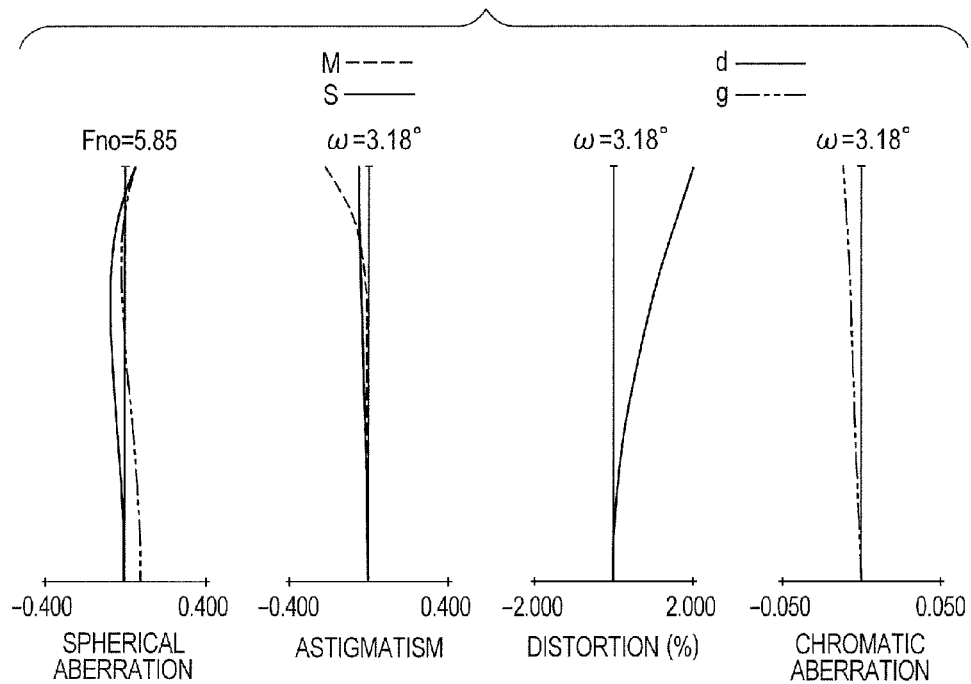
FIG. 5B is an aberration diagram at a telephoto end at the infinite object distance of the zoom lens according to Example 2 of the present invention.
Figure 6A:
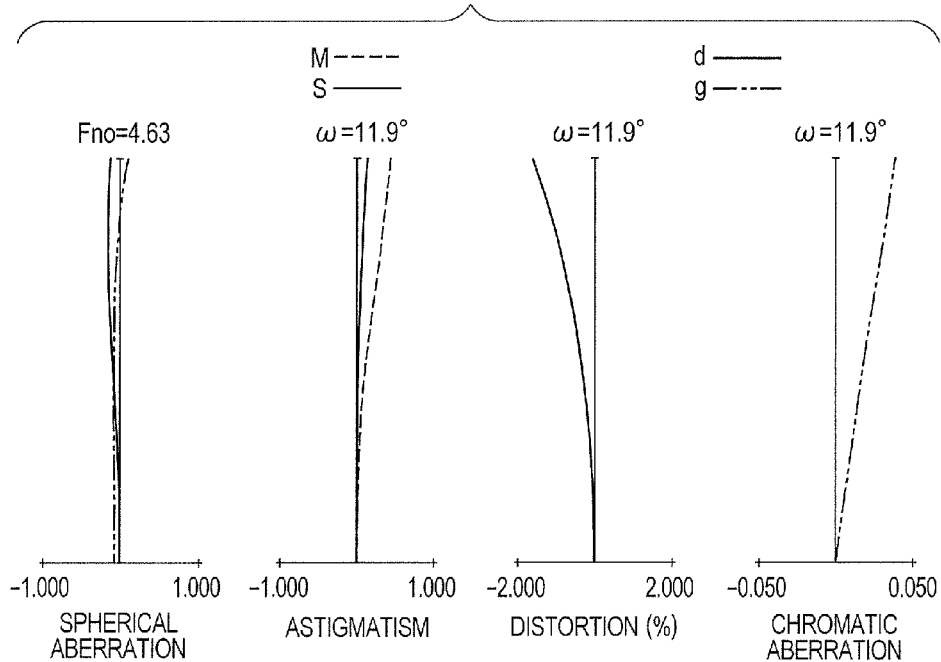
FIG. 6A is an aberration diagram at the wide angle end at the object distance of 1 m of the zoom lens according to Example 2 of the present invention.
Figure 6B:
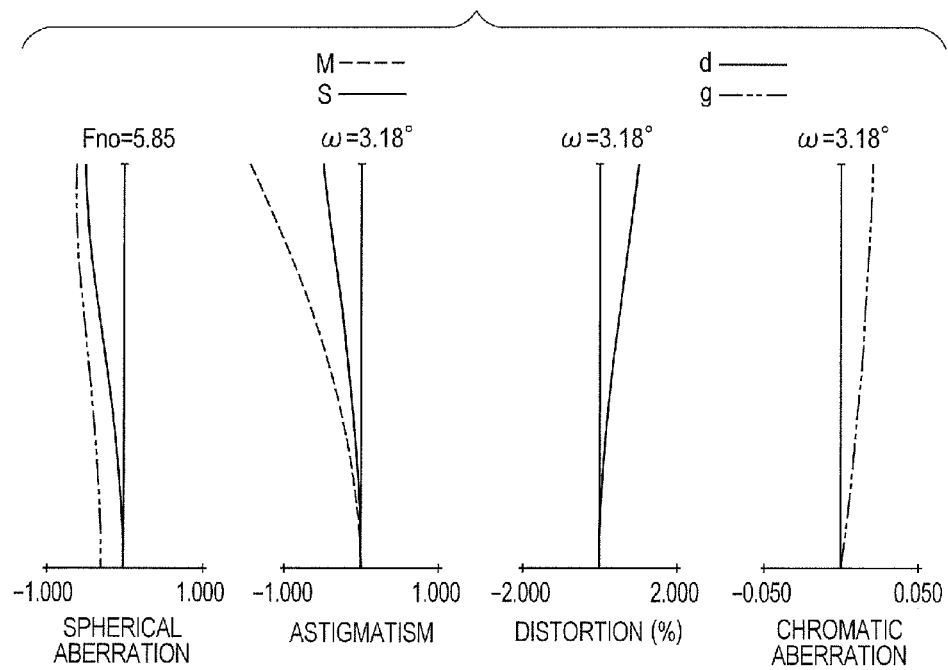
FIG. 6B is an aberration diagram at the telephoto end at the object distance of 1 m of the zoom lens according to Example 2 of the present invention.

FIG. 4 is a lens cross-sectional view at a wide angle end of a zoom lens according to Example 2 of the present invention. FIG. 5A is a longitudinal aberration diagram at a wide angle end when the zoom lens is focused on infinity according to Example 2 of the present invention. FIG. 5B is a longitudinal aberration diagram at a telephoto end when the zoom lens is focused on the infinity according to Example 2 of the present invention. FIG. 6A is a longitudinal aberration diagram at the wide angle end when the zoom lens is focused on an object at an object distance of 1.0 m according to Example 2 of the present invention. FIG. 6B is a longitudinal aberration diagram at the telephoto end when the zoom lens is focused on the object at the object distance of 1.0 m according to Example 2 of the present invention. Example 2 relates to a six-unit zoom lens having a zoom ratio of 3.78 and an F number of 4.63 to 5.85.

Figure 7:
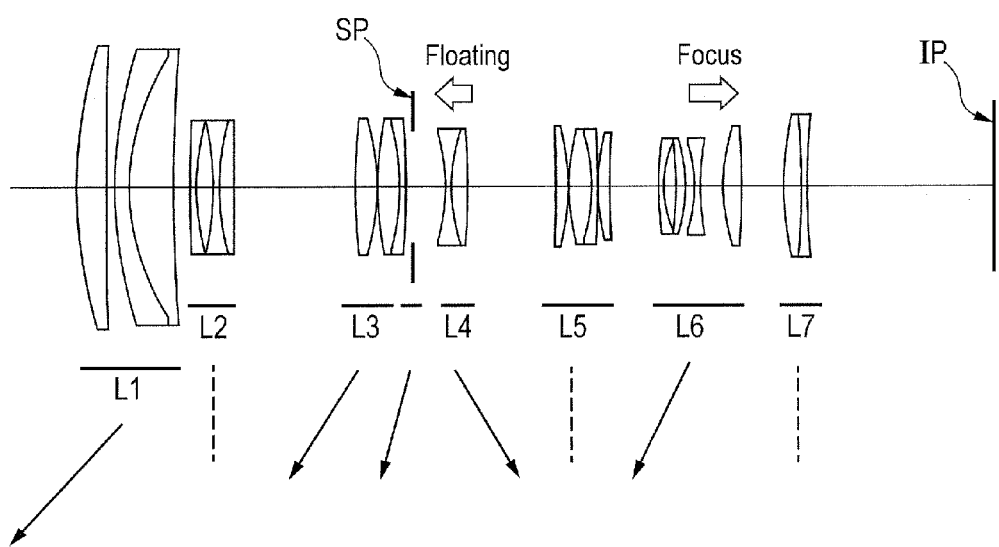
FIG. 7 is a lens cross-sectional view at a wide angle end of a zoom lens according to Example 3 of the present invention.
Figure 8A:
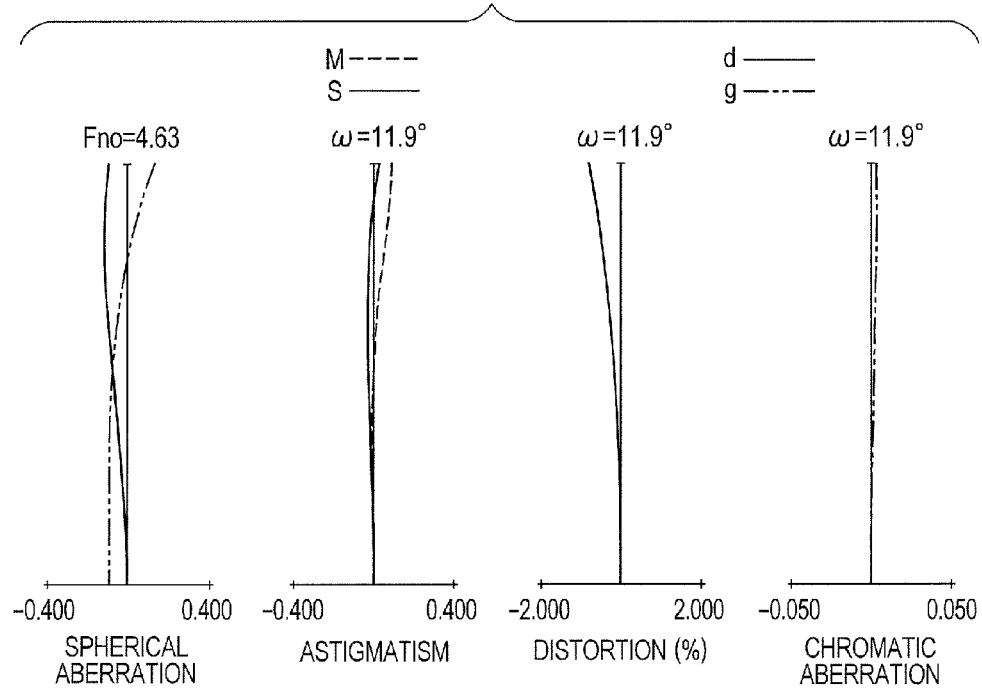
FIG. 8A is an aberration diagram at the wide angle end at an infinite object distance of the zoom lens according to Example 3 of the present invention.
Figure 8B:
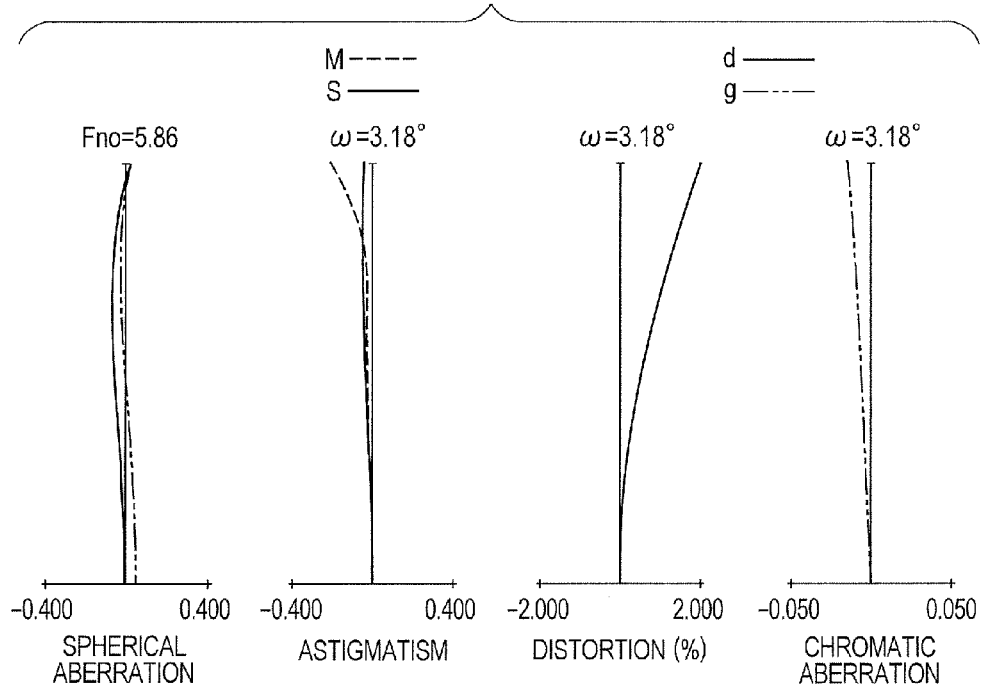
FIG. 8B is an aberration diagram at a telephoto end at the infinite object distance of the zoom lens according to Example 3 of the present invention.

FIG. 7 is a lens cross-sectional view at a wide angle end of a zoom lens according to Example 3 of the present invention. FIG. 8A is a longitudinal aberration diagram at a wide angle end when the zoom lens is focused on infinity according to Example 3 of the present invention. FIG. 8B is a longitudinal aberration diagram at a telephoto end when the zoom lens is focused on the infinity according to Example 3 of the present invention. FIG. 9A is a longitudinal aberration diagram at the wide angle end when the zoom lens is focused on an object at an object distance of 1.0 m according to Example 3 of the present invention. FIG. 9B is a longitudinal aberration diagram at the telephoto end when the zoom lens is focused on the object at the object distance of 1.0 m according to Example 3 of the present invention. Example 3 relates to a seven-unit zoom lens having a zoom ratio of 3.78 and an F number of 4.63 to 5.86.

Figure 10:
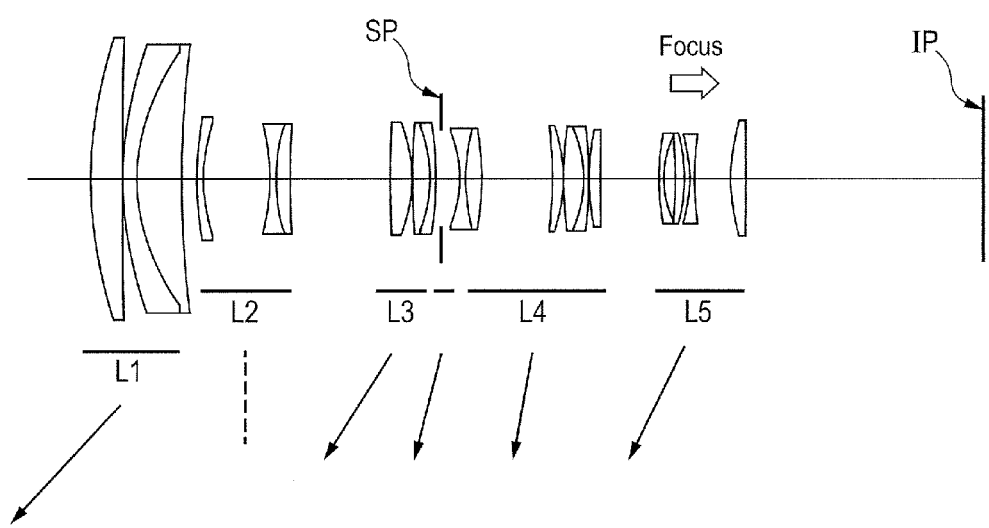
FIG. 10 is a lens cross-sectional view at a wide angle end of a zoom lens according to Example 4 of the present invention.
Figure 11A:
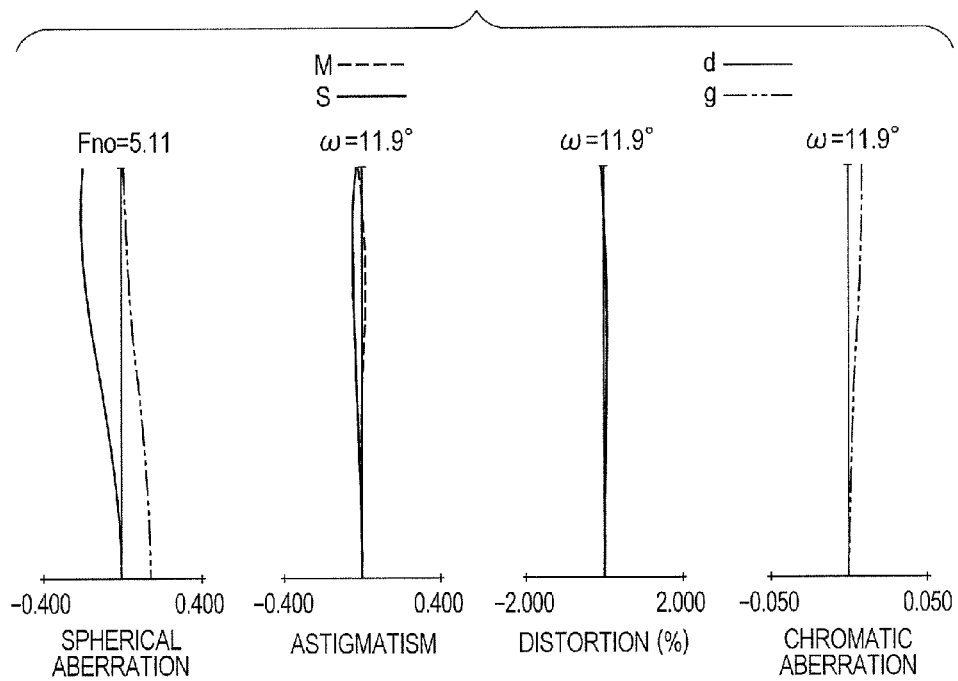
FIG. 11A is an aberration diagram at the wide angle end at an infinite object distance of the zoom lens according to Example 4 of the present invention.
Figure 11B:
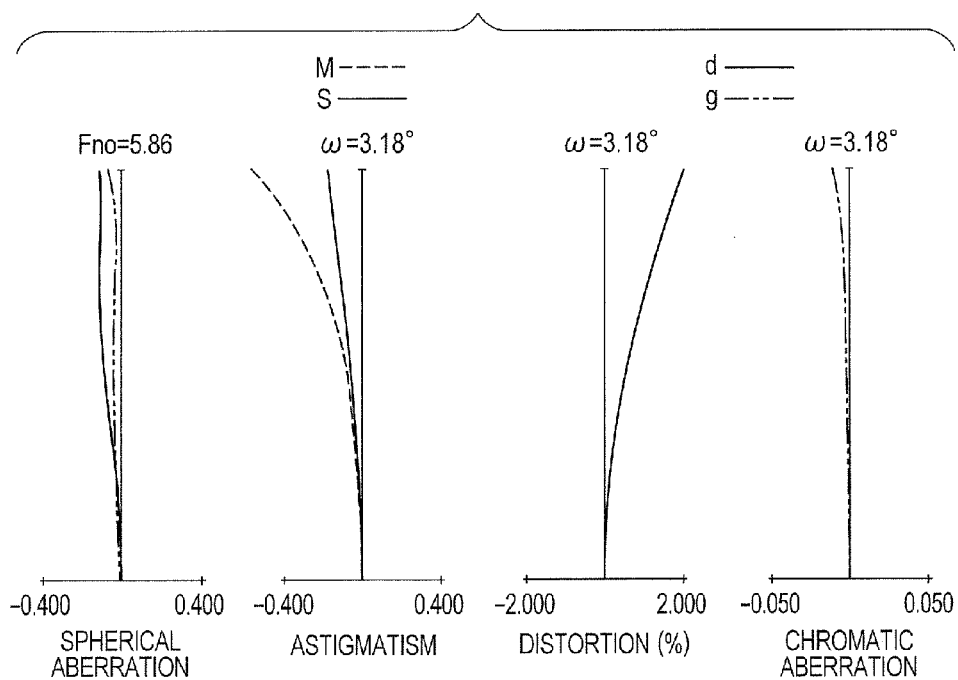
FIG. 11B is an aberration diagram at a telephoto end at the infinite object distance of the zoom lens according to Example 4 of the present invention.
Figure 12A:
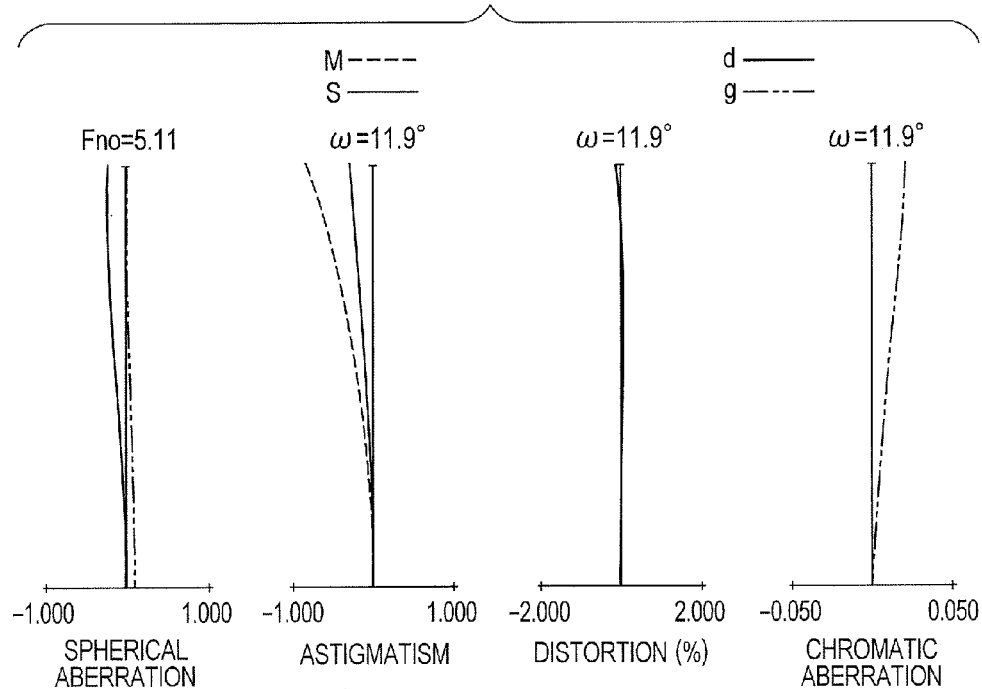
FIG. 12A is an aberration diagram at the wide angle end at the object distance of 1 m of the zoom lens according to Example 4 of the present invention.
Figure 12B:
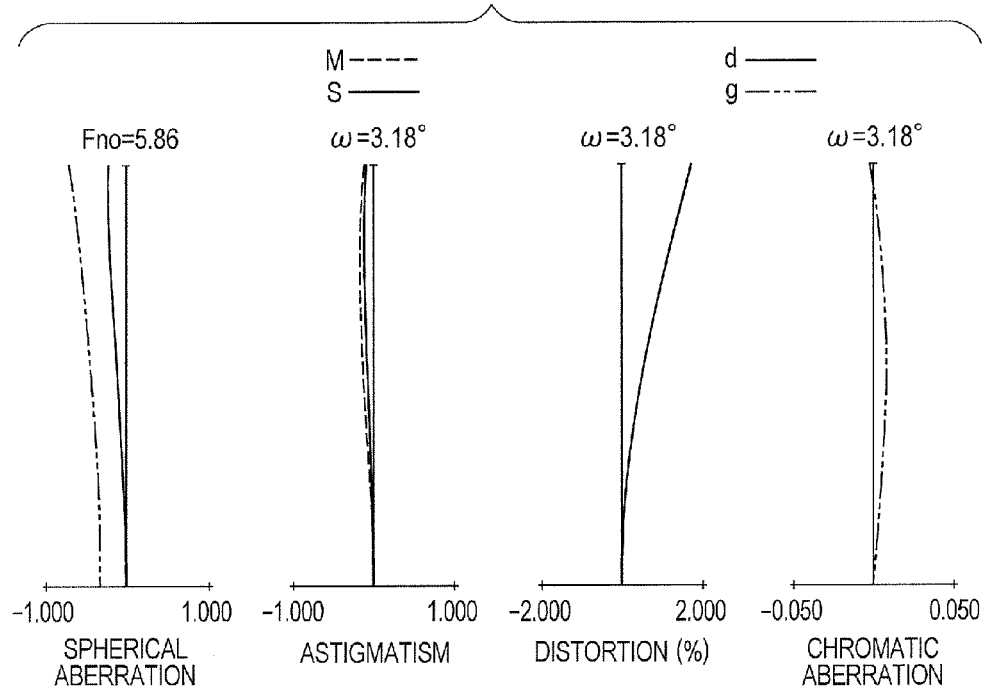
FIG. 12B is an aberration diagram at the telephoto end at the object distance of 1 m of the zoom lens according to Example 4 of the present invention.

FIG. 10 is a lens cross-sectional view at a wide angle end of a zoom lens according to Example 4 of the present invention. FIG. 11A is a longitudinal aberration diagram at a wide angle end when the zoom lens is focused on infinity according to Example 4 of the present invention. FIG. 11B is a longitudinal aberration diagram at a telephoto end when the zoom lens is focused on the infinity according to Example 4 of the present invention. FIG. 12A is a longitudinal aberration diagram at the wide angle end when the zoom lens is focused on an object at an object distance of 1.0 m according to Example 4 of the present invention. FIG. 12B is a longitudinal aberration diagram at the telephoto end when the zoom lens is focused on the object at the object distance of 1.0 m according to Example 4 of the present invention.

Figure 13:
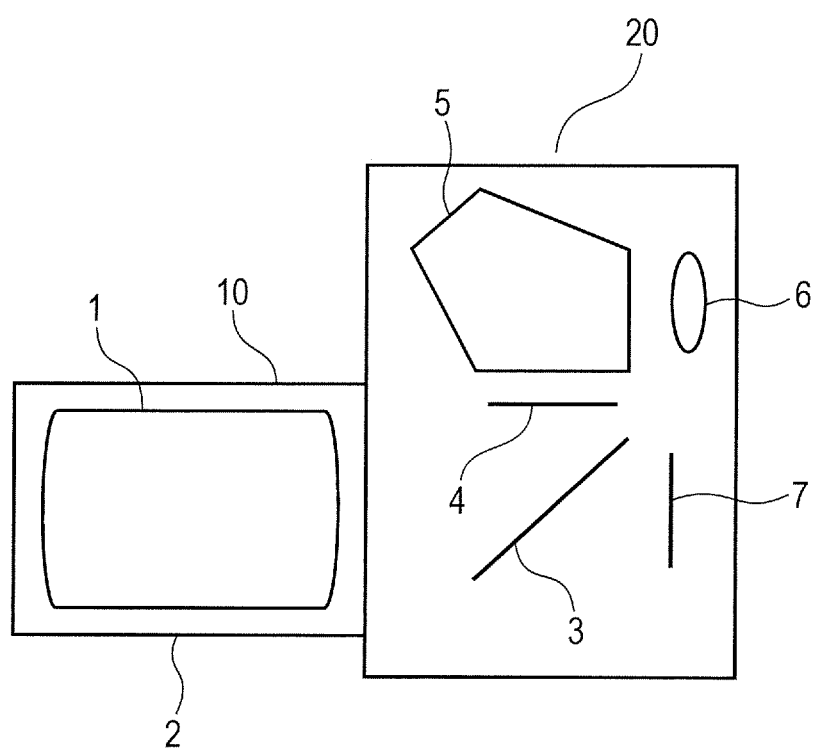
FIG. 13 is a view illustrating a main part of an image pickup apparatus according to the present invention.

Example 4 relates to a five-unit zoom lens having a zoom ratio of 3.78 and an F number of 5.11 to 5.86. FIG. 13 is a schematic view illustrating a main part of an image pickup apparatus including the zoom lens according to the present invention.

The zoom lens of each of the embodiments is a photographing lens system used for an image pickup apparatus such as a digital still camera or a silver-halide film camera. On each of the lens sectional views, the left is an object side (front side), whereas the right is an image side (rear side). When the zoom lens of each of the embodiments is used for a projecting lens such as a projector, the left is a screen side, whereas the right is a projected image side. In the lens cross-sectional views, symbol i represents the order of the lens units from the object side, and symbol Li represents an i-th lens unit.

The zoom lens includes an aperture stop SP (F– number determining stop). An image plane IP corresponds to an imaging plane of a solid-state image pickup element (photoelectric conversion element) such as a CCD sensor or a CMOS sensor when the zoom lens is used as an imaging optical system of a video camera or a digital still camera, and corresponds to a film plane when the zoom lens is used as an imaging optical system of a silver-halide film camera. An arrow indicates a movement locus of each of the lens units during zooming from the wide angle end to the telephoto end. Arrows concerning focus and floating indicates movement directions of each of the lens units in focusing from infinity to close distance.

In the spherical aberration diagram, a solid line and a chain double-dashed line indicate a d-line (having a wavelength of 587.6 nm) and a g-line (having a wavelength of 435.8 nm), respectively. In the astigmatism diagram, a broken line and a solid line indicate a meridional image plane and a sagittal image plane, respectively. In addition, a distortion is indicated by the d-line. A chromatic aberration of magnification is indicated by the g-line. Symbol ω represents a half field angle, and symbol FNo represents an F number. Note that, in Examples described below, the wide angle and the telephoto end respectively refer to zoom positions when a magnification-varying lens unit is located at both ends of a mechanically movable range on an optical axis.

In the zoom lens in which the first lens moves during the zooming and the focusing, when the focusing is carried out by using only the first lens unit, a movement amount of a lens unit for focusing can be made constant over the entire zoom range.

On the other hand, in the first lens unit of the zoom lens, an incidence height of on-axial ray and an incidence height of off-axis principal ray both increase. For this reason, the deterioration sensitivity of the optical characteristic to the eccentricity is large. For this reason, with the structure in which the first lens unit moves during the zooming and the focusing, a movement structure of the first lens unit is multiplexed, and hence the deterioration of the optical characteristic due to a manufacture error is more liable to occur. In addition, in many cases, the weight of the first lens unit is heaviest among all the lens units. For this reason, the autofocus is difficult to speed up.

In addition, when the focusing is carried out by using the first lens unit, the first lens unit may be held down by an external force. When an ultrasonic motor is used as a drive unit in that case, the ultrasonic motor generates an abnormal sound in some cases. For this reason, the so-called full-time manual operation in which the autofocus and the manual-focus are used together in real time becomes difficult.

On the other hand, in the zoom lens in which the focusing is carried out by using a final lens unit or a lens unit in the vicinity thereof (hereinafter referred to as "final lens unit"), the final lens unit is small and lightweight in many cases, and hence it becomes easy to speed up the autofocus. In addition, because a load applied to the drive motor is small and the focusing is carried out by using the internal lens unit(s) to which no external force is applied, it also becomes easy to carry out the full-time manual operation.

However, because the final lens unit is located in a position where an on-axial beam converges to the image side, when the final lens unit moves for the focusing, the incidence height of the on-axial ray in the final lens unit is greatly changed. For this reason, this system has a tendency that the variation in spherical aberration by the focusing becomes large at the telephoto end.

The inventor of the present invention found out that the final lens unit is arranged in the position where the incidence height of the on-axial ray does not become high so much at the telephoto end, and the power (refractive power) of the final lens unit is moderately suppressed, to thereby enable the variation in spherical aberration by the focusing to be suppressed.

However, with this method, the sensitivity of the image plane movement by the focusing is small, and hence a driving amount when proximity photographing is carried out becomes large. As a result, it is not necessarily possible to achieve both the reduction in size and the proximity focusing.

Then, the inventor of the present invention found out that it is preferred that the power of the final lens unit be strengthened to some degree, and the front principal point position of the lens unit for focusing be arranged on the object side as much as possible. According to this finding, a state in which the ray is caused to enter the lens unit having the relatively strong power so that the incidence height of the on-axial ray becomes high can be substantially created at the telephoto end. Specifically, in the final lens unit, a negative lens, a positive lens, a negative lens, and a positive lens were arranged in order from the object side to the image side. As a result, it was found out that the spherical aberration can be satisfactorily corrected while the predetermined focus sensitivity is ensured.

When two negative lenses are continuously arranged in the final lens unit, even if the strong positive lens is arranged on the image side of the final lens unit, it becomes difficult to correct the spherical aberration because a difference with the incidence height of the on-axial ray in the position of the negative lens is too large. In addition, even in the case of a three-lens structure including a negative lens, a positive lens, and a negative lens, it becomes difficult to arrange the principal point position on the object side because the positive power of the correction for the spherical aberration becomes too weak. In addition, in the case of the lens structure in which the positive lens is firstly arranged closest to the object side, it becomes difficult to arrange the principal point position on the object side. As a result, it becomes difficult to increase the sensitivity of the image plane movement by the focusing.

By adopting the following structure, the present invention has a feature in providing the zoom lens with which the proximity photographing is easy to carry out, and which has the high optical characteristic over the entire zoom range and the entire focus range. The zoom lens includes, in order from the object side to the image side, a first lens unit L1 having a positive refractive power, a second lens unit L2 having a negative refractive power, and at least three lens units. During the zooming, the interval between each adjacent two lens units is changed. In addition, an N-th ($5 \leq N$) lens unit counted from the object side has a negative refractive power. During the focusing from the infinity to the short distance, the N-th lens unit moves to the image side. The N-th lens unit includes, in order from the object side to the image side, a negative lens, a positive lens, a negative lens, and a positive lens.

The following conditional expressions are satisfied:

$$-0.15 < f_N/f_T < -0.05 \qquad (1)$$

$$-0.30 < o_{1N}/d_N < 0.05 \qquad (2)$$

where $f_N$ represents a focal length of the N-th lens unit, $f_T$ represents a focal length of the entire system at the telephoto end, $o_{1N}$ represents a distance from a surface vertex on the object side of the N-th lens unit to a front principal point position of the N-th lens unit, and $d_N$ represents a length on the optical axis of the N-th lens unit.

Next, the technical meanings of the above-mentioned conditional expressions (1) and (2) are described. The conditional expression (1) is set in order to strengthen the power (refractive power) of the N-th lens unit, to thereby suppress the variation in spherical aberration while the sensitivity of the image plane movement by the focusing is strengthened. When a value of $f_N/f_T$ in the conditional expression (1) falls below a lower limit value, the negative power of the N-th lens unit is too weak (an absolute value of the negative refractive power becomes too small), and hence the proximity photographing becomes difficult. On the other hand, when the value of $f_N/f_T$ in the conditional expression (1) exceeds an upper limit value, the negative power of the N-th lens unit is too strong (the absolute value of the negative refractive power becomes too large), and hence the variation in spherical aberration becomes large during the focusing.

The conditional expression (2) is set in order to increase the sensitivity of the image plane movement by the focusing in such a way that the front principal point position of the N-th lens unit is located on the object side as much as possible. When a value of $o_{1N}/d_N$ in the conditional expression (2) exceeds an upper limit value, the incidence height of the on-axial ray in the front principal point position becomes low and the sensitivity of the image plane movement by the focusing becomes low, and hence the proximity photographing becomes difficult. On the other hand, when the value of $o_{1N}/d_N$ in the conditional expression (2) falls below a lower limit value, the negative power of the N-th lens unit becomes too strong, and hence during the focusing, the variation in spherical aberration becomes large. It is more preferred to set the numerical ranges of the conditional expressions (1) and (2) as follows.

$$-0.14 < f_N/f_T < -0.08 \quad (1a)$$

$$-0.25 < o_{1N}/d_N < 0.02 \quad (2a)$$

By adopting the structure described above, the zoom lens is provided with which the proximity photographing is readily carried out, and which has the high optical characteristic over the entire zoom range and the entire focus range.

In the present invention, it is more preferred to satisfy one or more of the following conditional expressions. A distance from the surface vertex on the object side of the N-th lens unit at the telephoto end to the image plane is represented by $L_N$. An interval between the third lens counted from the object side of the N-th lens unit and the fourth lens counted therefrom is represented by $d_{34}$. In addition, a focal length of the (N−1)th lens unit is represented by $f_{N-1}$.

The focusing can be made on the object distance which is five times as long as the focal length of the entire system at the telephoto end. In this case, it is preferred to satisfy one or more of the following conditional expressions:

$$0.15 < L_N/f_T < 0.35 \quad (3)$$

$$0.15 < d_{34}/d_N < 0.60 \quad (4)$$

$$0.05 < f_{N-1}/f_T < 0.20 \quad (5)$$

$$0.015 < D_T(5f_T)/f_T < 0.030 \quad (6)$$

$$0.35 < f_1/f_T < 0.60 \quad (7)$$

$$-0.20 < f_2/f_T < -0.10 \quad (8)$$

where $D_T(X)$ represents a movement amount of N-th lens unit when the focusing is made from the infinity to the object distance of X (mm) at the telephoto end, $f_1$ represents a focal length of the first lens unit L1, and $f_2$ represents a focal length of the second lens unit L2. Regarding the signs of the movement amount, the movement to the image side is regarded as a positive movement, and the movement to the object side is regarded as a negative movement.

Next, the technical meanings of the conditional expressions (3) to (8) are described.

The conditional expression (3) is set in order to arrange the position on the optical axis at the telephoto end of the N-th lens unit in an appropriate range. When a value of $L_N/f_T$ in the conditional expression (3) exceeds an upper limit value, the N-th lens unit at the telephoto end comes too close to the object side. As a result, the incidence height of the on-axial ray increases, and hence the variation in spherical aberration becomes large. On the other hand, when the value of $L_N/f_T$ in the conditional expression (3) falls below a lower limit value, the N-th lens unit at the telephoto end comes too close to the image side. As a result, the incidence height of the on-axial ray decreases and the sensitivity of the image plane movement by the focusing decreases, and hence the proximity photographing becomes difficult.

The conditional expression (4) is set in order to appropriately arrange the third lens (negative lens) counted from the object side in the N-th lens unit and the fourth lens (positive lens) counted from the object side in the N-th lens unit, to thereby effectively arrange the principal point position on the object side. When a value of $d_{34}/d_N$ in the conditional expression (4) exceeds an upper limit value, it becomes difficult to correct the variation in spherical aberration generated in the third lens during the focusing by the fourth lens. On the other hand, when the value of $d_{34}/d_N$ in the conditional expression (4) falls below a lower limit value, the negative power with which the front principal point position of the N-th lens unit is to be arranged on the object side needs to be strengthened, and hence the variation in spherical aberration increases. This is not preferred.

It is preferred that, in the zoom lens of the present invention, the (N−1)th lens unit have the positive power. In this case, the negative power of the N-th lens unit is readily strengthened so as to satisfy the condition of the conditional expression (1), and hence it becomes easy to increase the sensitivity of the image plane movement by the focusing.

The conditional expression (5) is set in order to appropriately set the power of the (N−1)th lens unit. When a value of $f_{N-1}/f_T$ in the conditional expression (5) exceeds an upper limit value to weaken the positive power of the (N−1)th lens unit, it becomes difficult to strengthen the power of the N-th lens unit, and hence it becomes difficult to increase the sensitivity of the image plane movement by the focusing. On the other hand, when the value of $f_{N-1}/f_T$ in the conditional expression (5) falls below from a lower limit value to strengthen the positive power of the (N−1)th lens unit, the power of the N-th lens unit also needs to be strengthened, and hence the variation in the spherical aberration by the focusing increases. This is not preferred.

In addition, when the power of the (N−1)th lens unit becomes too strong, this is not preferred because the variation in aberration by not only the focusing but also the zooming increases. The zoom lens with which the proximity photographing can be carried out as used in the present invention means that the object distance in which the focusing can be made with the image plane as reference is five times or less as long as the focal length at the telephoto end at minimum, and is more preferably three times or less as long as the focal length at the telephoto end.

The conditional expression (6) relates to a movement amount of the N-th lens unit during the focusing when the zoom lens is focused on a distance which is five times as long as the focal length of the entire system at the telephoto end. When a value of $D_T(5f_T)/f_T$ in the conditional expression (6) exceeds from an upper limit value, the movement amount of N-th lens unit during the focusing at that time becomes too large, and hence the entire lens system is increased in size. On the other hand, when the value of $D_T(5f_T)/f_T$ in the conditional expression (6) falls below a lower limit value, the variation in spherical aberration increases.

The conditional expression (7) is set in order to appropriately set the refractive power of the first lens unit. The conditional expression (8) is set in order to appropriately set the refractive power of the second lens unit. When a value of $f_1/f_T$ in the conditional expression (7) exceeds an upper limit value or a value of $f_2/f_T$ in the conditional expression (8) falls below a lower limit value, the absolute values of the respective refractive powers become too small, and hence the entire system is increased in size. On the other hand, when a value of $f_1/f_T$ in the conditional expression (7) falls below a lower limit value or a value of $f_2/f_T$ in the conditional expression (8) exceeds an upper limit value, the absolute values of the respective refractive powers become too large, and hence the variation in aberration by the zooming increases. Therefore, this is not preferred. It is more preferred to set the numerical value ranges of the conditional expressions (3) to (8) as follows.

$$0.20 < L_N/f_T < 0.30 \quad (3a)$$

$$0.20 < d_{34}/d_N < 0.50 \quad (4a)$$

$$0.08 < f_{N-1}/f_T < 0.15 \quad (5a)$$

$$0.018 < D_T(5f_T)/f_T < 0.025 \quad (6a)$$

$$0.40 < f_1/f_T < 0.55 \quad (7a)$$

$$-0.17 < f_2/f_T < -0.12 \quad (8a)$$

It is preferred to adopt the following structure in the zoom lens of the present invention in terms of the aberration correction. The (N−1)th lens unit counted from the object side has the positive refractive power, to thereby readily increase the sensitivity of the image plane movement by the focusing.

It is preferred to move at least one of the third lens unit counted from the object side to the (N−1)th lens unit counted therefrom during the focusing. It is preferred that the (N−2)th lens unit counted from the object side have the negative refractive power, and move to the object side during the focusing from the infinity to the short distance. In this case, the variation in aberration during the focusing becomes easy to reduce.

The zoom lens of the present invention, for example, is structured in order from the object side to the image side as follows. That is, the zoom lens is a six-unit zoom lens including, in order from the object side to the image side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a negative refractive power. In this case, the focusing is carried out by using the sixth lens unit (N-th lens unit). In addition, the zoom lens of the present invention, for example, is structured in order from the object side to the image side as follows.

The zoom lens is a seven-unit zoom lens including, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, a sixth lens unit having a negative refractive power, and a seventh lens unit having a positive refractive power. In this case, the focusing is carried out by using the sixth lens unit (N-th lens unit).

In addition, the zoom lens is a five-unit zoom lens including, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. In this case, the focusing is carried out by using the fifth lens unit (N-th lens unit). In addition, a lens unit having a positive or negative refractive power may be arranged closer to the image side than the lens units for focusing. As a result, it becomes easy to increase the sensitivity of the image plane movement by the focusing of the lens unit for focusing.

Here, the lens unit as used in the present invention refers to lenses included from the most front surface of the optical system or a surface for which an interval with a lens adjacent to the front side of the optical system is changed by the zooming or the focusing to the most rear surface of the optical system or a surface for which an interval with a lens adjacent to the rear side of the optical system is changed by the zooming or the focusing.

The structures in Examples are now described. A zoom lens of Example 1 is structured in order from the object side to the image side as follows. That is, the zoom lens of Example 1 is a six-unit zoom lens including, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a negative refractive power. During the zooming, the second lens unit L2 and the fifth lens unit L5 do not move. During the zooming from the wide angle end to the telephoto end, the first lens unit L1, the third lens unit L3, and the sixth lens unit L6 move to the object side, and the fourth lens unit L4 moves to the image side.

In addition, the sixth lens unit L6 moves to the image side, to thereby carry out the main focusing from the infinity to the short distance. Note that, the fourth lens unit L4 also slightly moves to the object side in an auxiliary manner during the focusing from the infinity to the short distance, but the variation in field curvature is mainly corrected at the wide angle end by this movement of the fourth lens unit L4. The effect of correcting the variation of the spherical aberration is less at the telephoto end. In addition, the zoom lens of Example 1 can be focused on the distance to 1.0 m (when the size in the numerical example is expressed in units of mm (the same applies to the following)) from the image plane in the shortest, and can carry out the proximity focusing to a distance which is three times or less as long as the focal length at the telephoto end.

In the sixth lens unit L6, a negative lens, a positive lens, a negative lens, and a positive lens are arranged in order from the object side to the image side. With this, the sensitivity of the image plane movement by the focusing is effectively obtained, and the variation in spherical aberration is easily suppressed. In addition, the power (refractive power) and the front principal point position of the sixth lens unit L6 satisfy the conditional expressions (1) and (2). In addition, the sixth lens unit L6 is arranged in the position on the optical axis which satisfies the conditional expression (3). That is, this configuration means that the lens unit having the relatively strong refractive power is arranged in the position where the incidence height of the on-axial ray is large, to thereby effectively increase the focusing sensitivity.

In addition, the interval between the third lens having the negative refractive power and the fourth lens having the positive refractive power in the sixth lens unit L6 satisfies the conditional expression (4), to thereby effectively move the front principal point position to the object side. In addition, the fifth lens unit L5 has the positive refractive power which satisfies the conditional expression (5). In this way, the sensitivity of the image plane movement by the focusing of the sixth lens unit L6 is easily increased. In addition, a relationship between the proximity photographing distance and the movement amount of the lens unit for focusing at that time satisfies the conditional expression (6). In this way, the proximity photographing is attained while the entire system is downsized.

In addition, the powers of the first lens unit L1 and the second lens unit L2 satisfy the conditional expressions (7) and (8), to thereby obtain the high optical characteristic over the entire zoom range.

Example 2 relates to a six-unit zoom lens which has the same refractive power arrangement as that in Example 1. The movement conditions of the lens units during the zooming from the wide angle end to the telephoto end are the same as those in Example 1. The movement conditions of the lens units during the focusing from the infinity to the short distance are also the same as those in Example 1. In addition, the zoom lens of Example 2 can be focused on a distance up to 1.0 m from the image plane in the shortest, and can carry out the proximity focusing up to a distance which is three times or less as long as the focal length at the telephoto end. In addition thereto, the operations of the lens units in Example 2 are the same as those in Example 1.

A zoom lens of Example 3 is structured in order from the object side to the image side as follows. That is, the zoom lens of Example 3 is a seven-unit zoom lens including a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power, and a seventh lens unit L7 having a positive refractive power. During the zooming, the second lens unit L2, the fifth lens unit L5, and the seventh lens unit L7 do not move. During the zooming from the wide angle end to the telephoto end, the first lens unit L1, the third lens unit L3, and the sixth lens unit L6 move to the object side, and the fourth lens unit L4 moves to the image side.

In addition, the sixth lens unit L6 moves to the image side, to thereby carry out the main focusing from the infinity to the short distance. Further, during the focusing from the infinity to the short distance, the fourth lens unit L4 also slightly moves to the object side in an auxiliary manner. In addition, the zoom lens of Example 3 can be focused on a distance up to 1.0 m from the image plane in the shortest, and can carry out the proximity focusing up to a distance which is three times or less as long as the focal length at the telephoto end. The operations of the first to sixth lens units L1 to L6 in Example 3 are the same as those in Example 1. In Example 3, the sensitivity of the image plane movement by the focusing can be increased because the seventh lens unit L7 having the positive refractive power is arranged.

A zoom lens of Example 4 is structured in order from the object side to the image side as follows. That is, the zoom lens of Example 4 is a five-unit zoom lens including a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. During the zooming, the second lens unit L2 does not move. During the zooming from the wide angle end to the telephoto end, the first lens unit L1, the third lens unit L3, the fourth lens unit L4, and the fifth lens unit L5 move to the object side. In addition, the fifth lens unit L5 moves to the image side, to thereby carry out the focusing from the infinity to the short distance.

In addition, the zoom lens of Example 4 can be focused on a distance up to 1.0 m from the image plane in the shortest, and can carry out the proximity focusing up to a distance which is three times or less as long as the focal length at the telephoto end. In Example 4, unlike Examples 1 to 3, the lens unit which is auxiliary driven during the focusing is absent. However, as can be seen from the aberration diagram, it is understood that at the telephoto end, the variation in spherical aberration compares favorably with that in each of Examples 1 to 3.

The exemplary examples of the present invention are described above, but it should be understood that the present invention is not limited to those examples and can be modified and changed variously within the scope of the gist thereof.

Next, an image pickup apparatus including the zoom lens described in Examples 1 to 4 is described. FIG. 13 is a schematic diagram of a main part of a single-lens reflex camera. In FIG. 13, an imaging lens 10 includes a zoom lens 1 of any one of Examples 1 to 4. The zoom lens 1 is held by a lens barrel 2 as a holding member. A camera main body 20 includes a quick return mirror 3 for reflecting a light beam from the imaging lens 10 to the upward direction, and a reticle plate 4 arranged in an image forming position for the imaging lens 10. The camera main body 20 further includes a penta roof prism 5 for converting an inverse image formed on the reticle plate 4 into an erect image, and an eyepiece lens 6 for observing the erect image.

As a photosensitive plane 7, there is arranged a solid-state image pickup element (photo-electric conversion element) such as a CCD sensor or a CMOS sensor for receiving the image, or a silver halide film. When taking an image, the quick return mirror 3 is retracted from the optical path, and an image is formed on the photosensitive plane 7 by the imaging lens 10. Benefits described in Examples 1 to 4 are effectively enjoyed by the image pickup apparatus disclosed in this example.

The zoom lens of the present invention can also be applied to a single-lens reflex camera which does not include a quick return mirror. In addition thereto, the zoom lens of the present invention can be variably applied to optical instruments (for example, an image pickup apparatus, an image projector, and other optical instruments) including the optical system as described above.

Numerical Examples 1 to 4 corresponding to Examples 1 to 4 are shown below. In each of Numerical Examples 1 to 4, symbol i represents the order of the surfaces from the object side, and symbol ri represents a radius of curvature of the lens surface. Symbol di represents a lens thickness or an air interval between an i-th surface and an (i+1)th surface. Symbols ndi and vdi represent a refractive index and an Abbe constant for the d-line, respectively. In addition, an effective diameter is shown in each of Numerical Examples 1 to 4.

Moreover, in addition to specifications of a focal length, an F number, and the like, a field angle represents a half field angle of the entire lens system, an image height represents a maximum image height used to determine the half field angle, and a total lens length represents a value obtained by adding a back focal distance to a distance from a first lens surface to a final lens surface. Symbol BF represents the back focal distance corresponding to a length from the final lens surface to an image plane.

In addition, the part where an interval d between optical surfaces is (variable) is changed for zooming, and the interval between surfaces corresponding to the focal length is shown in an annexed table. In addition, zoom lens unit data represents a focal length, a lens structure length (length on optical axis), a front principal point position, and a rear principal point position of each of the lens units. Note that, Table 1 shows lens data in Numerical Examples 1 to 4 described below, and results of calculations of the conditional expressions based on the lens data in Numerical Examples 1 to 4.

Numerical Example 1

Unit mm

Surface data

| Surface number | r | d | nd | vd | Effective diameter |
|---|---|---|---|---|---|
| 1 | 124.836 | 7.20 | 1.48749 | 70.2 | 69.65 |
| 2 | 1676.693 | 0.98 | | | 69.10 |
| 3 | 120.004 | 3.50 | 1.65412 | 39.7 | 67.48 |
| 4 | 61.568 | 10.94 | 1.49700 | 81.5 | 64.31 |
| 5 | 544.957 | (Variable) | | | 63.39 |
| 6 | 431.883 | 1.60 | 1.77250 | 49.6 | 31.94 |
| 7 | 60.657 | 4.14 | | | 31.12 |
| 8 | −69.337 | 1.60 | 1.69680 | 55.5 | 31.11 |
| 9 | 69.337 | 3.45 | 1.84666 | 23.8 | 32.00 |
| 10 | −39825.716 | (Variable) | | | 32.18 |
| 11 | 144.059 | 5.43 | 1.43387 | 95.1 | 32.64 |
| 12 | −58.691 | 0.15 | | | 32.81 |
| 13 | 86.387 | 5.40 | 1.51742 | 52.4 | 32.25 |
| 14 | −63.789 | 1.60 | 2.00100 | 29.1 | 31.84 |
| 15 | −230.312 | (Variable) | | | 31.72 |
| 16 (Stop) | ∞ | (Variable) | | | 27.81 |
| 17 | −48.183 | 1.40 | 1.60342 | 38.0 | 26.92 |
| 18 | 48.183 | 3.96 | 1.78472 | 25.7 | 27.64 |
| 19 | −272.606 | (Variable) | | | 27.73 |
| 20 | −190.803 | 2.96 | 1.77250 | 49.6 | 28.33 |
| 21 | −54.451 | 0.15 | | | 28.46 |
| 22 | 55.678 | 5.76 | 1.48749 | 70.2 | 27.38 |
| 23 | −46.398 | 1.40 | 1.84666 | 23.8 | 26.64 |
| 24 | −285.080 | 0.15 | | | 26.14 |
| 25 | 56.546 | 2.91 | 1.69680 | 55.5 | 25.45 |
| 26 | 227.154 | (Variable) | | | 24.75 |
| 27 | 85.447 | 1.10 | 1.77250 | 49.6 | 22.17 |
| 28 | 24.359 | 3.47 | | | 21.25 |
| 29 | −78.060 | 2.46 | 1.80518 | 25.4 | 21.32 |
| 30 | −33.722 | 1.28 | | | 21.68 |
| 31 | −32.129 | 1.10 | 1.77250 | 49.6 | 21.59 |
| 32 | 94.043 | 6.50 | | | 22.55 |
| 33 | 56.876 | 4.39 | 1.61340 | 44.3 | 27.93 |
| 34 | −131.603 | | | | 28.34 |

Various data
Zoom ratio 3.78

Unit mm

| | Wide angle | Intermediate | Telephoto |
|---|---|---|---|
| Focal length | 102.79 | 199.97 | 389.03 |
| F number | 4.63 | 5.09 | 5.86 |
| Half field angle (degrees) | 11.89 | 6.17 | 3.18 |
| Image height | 21.64 | 21.64 | 21.64 |
| Total lens length | 229.72 | 281.23 | 301.71 |
| BF | 64.93 | 69.44 | 76.02 |
| d 5 | 4.00 | 55.51 | 76.00 |
| d10 | 30.80 | 23.46 | 1.18 |
| d15 | 1.60 | 3.74 | 17.22 |
| d16 | 8.54 | 21.82 | 37.70 |
| d19 | 22.58 | 14.50 | 7.42 |
| d26 | 12.30 | 7.79 | 1.20 |

Zoom lens unit data

| Unit | First surface | Focal length | Lens structure length | Front principal point position | Rear principal point position |
|---|---|---|---|---|---|
| 1 | 1 | 176.34 | 22.62 | −0.62 | −15.68 |
| 2 | 6 | −52.38 | 10.79 | 2.58 | −5.21 |
| 3 | 11 | 75.79 | 12.58 | 2.38 | −5.92 |
| 4 | 17 | −173.79 | 5.36 | −2.11 | −5.26 |
| 5 | 20 | 43.07 | 13.33 | 3.03 | −5.34 |
| 6 | 27 | −47.75 | 20.29 | −4.31 | −24.16 |

Numerical Example 2

Unit mm

Surface data

| Surface number | r | d | nd | vd | Effective diameter |
|---|---|---|---|---|---|
| 1 | 109.670 | 6.94 | 1.62299 | 58.2 | 69.44 |
| 2 | 495.105 | 0.15 | | | 68.74 |
| 3 | 147.450 | 2.70 | 1.65412 | 39.7 | 67.65 |
| 4 | 64.698 | 0.11 | | | 64.62 |
| 5 | 65.113 | 10.78 | 1.43875 | 94.9 | 64.62 |
| 6 | 1037.902 | (Variable) | | | 63.83 |
| 7 | 111.494 | 4.03 | 1.59551 | 39.2 | 33.84 |
| 8 | −147.429 | 1.70 | 1.77250 | 49.6 | 33.24 |
| 9 | 132.617 | 2.22 | | | 32.24 |
| 10 | 223.886 | 1.55 | 1.77250 | 49.6 | 31.72 |
| 11 | 63.492 | 4.14 | | | 31.05 |
| 12 | −63.227 | 1.55 | 1.60311 | 60.6 | 31.04 |
| 13 | 80.909 | 3.00 | 1.84666 | 23.8 | 31.94 |
| 14 | 689.532 | (Variable) | | | 32.10 |
| 15 | 132.772 | 5.44 | 1.43387 | 95.1 | 32.63 |
| 16 | −62.875 | 0.18 | | | 32.81 |
| 17 | 87.368 | 5.37 | 1.51742 | 52.4 | 32.34 |
| 18 | −66.028 | 1.60 | 1.90366 | 31.3 | 31.95 |
| 19 | −375.161 | (Variable) | | | 31.76 |
| 20 (Stop) | ∞ | (Variable) | | | 28.41 |
| 21 | −48.828 | 1.40 | 1.59270 | 35.3 | 27.04 |
| 22 | 48.828 | 3.87 | 1.78472 | 25.7 | 27.70 |
| 23 | −249.921 | (Variable) | | | 27.78 |
| 24 | −192.509 | 2.72 | 1.76200 | 40.1 | 27.74 |
| 25 | −53.844 | 0.16 | | | 27.82 |
| 26 | 57.166 | 5.64 | 1.48749 | 70.2 | 26.72 |
| 27 | −44.894 | 1.40 | 1.84666 | 23.8 | 25.94 |
| 28 | −452.162 | 0.15 | | | 25.41 |
| 29 | 52.725 | 2.93 | 1.72916 | 54.7 | 25.33 |
| 30 | 215.772 | (Variable) | | | 25.03 |
| 31 | 55.796 | 1.20 | 1.88300 | 40.8 | 23.34 |
| 32 | 23.347 | 4.08 | | | 22.28 |
| 33 | −65.479 | 2.53 | 1.80518 | 25.4 | 22.34 |

-continued

Unit mm

| | | | | | |
|---|---|---|---|---|---|
| 34 | −32.044 | 1.33 | | | 22.74 |
| 35 | −29.925 | 1.20 | 1.72916 | 54.7 | 22.63 |
| 36 | 99.181 | 4.30 | | | 23.80 |
| 37 | 51.642 | 4.11 | 1.65412 | 39.7 | 27.74 |
| 38 | −235.796 | | | | 28.05 |

Various data
Zoom ratio 3.78

| | Wide angle | Intermediate | Telephoto |
|---|---|---|---|
| Focal length | 102.79 | 199.97 | 389.03 |
| F number | 4.63 | 4.94 | 5.85 |
| Half field angle (degrees) | 11.89 | 6.17 | 3.18 |
| Image height | 21.64 | 21.64 | 21.64 |
| Total lens length | 234.72 | 286.21 | 311.71 |
| BF | 67.26 | 70.32 | 75.88 |
| d 6 | 1.50 | 53.00 | 78.50 |
| d14 | 37.75 | 24.29 | 1.40 |
| d19 | 1.61 | 11.57 | 26.37 |
| d20 | 11.62 | 22.70 | 35.24 |
| d23 | 16.52 | 8.94 | 4.50 |
| d30 | 9.98 | 6.91 | 1.35 |

Zoom lens unit data

| Unit | First surface | Focal length | Lens structure length | Front principal point position | Rear principal point position |
|---|---|---|---|---|---|
| 1 | 1 | 194.15 | 20.68 | −2.16 | −15.67 |
| 2 | 7 | −55.24 | 18.19 | 9.44 | −4.03 |
| 3 | 15 | 78.73 | 12.59 | 2.08 | −6.25 |
| 4 | 21 | −202.64 | 5.27 | −2.63 | −5.75 |
| 5 | 24 | 43.67 | 13.00 | 2.85 | −5.30 |
| 6 | 31 | −45.81 | 18.75 | −1.99 | −18.66 |

Numerical Example 3

Unit mm

Surface data

| Surface number | r | d | nd | vd | Effective diameter |
|---|---|---|---|---|---|
| 1 | 122.467 | 7.41 | 1.48749 | 70.2 | 69.77 |
| 2 | 2279.758 | 1.98 | | | 69.21 |
| 3 | 120.593 | 3.50 | 1.65412 | 39.7 | 67.21 |
| 4 | 59.881 | 10.99 | 1.49700 | 81.5 | 63.91 |
| 5 | 469.541 | (Variable) | | | 62.98 |
| 6 | 309.635 | 1.60 | 1.77250 | 49.6 | 31.96 |
| 7 | 57.766 | 4.33 | | | 31.11 |
| 8 | −66.259 | 1.60 | 1.69680 | 55.5 | 31.10 |
| 9 | 68.814 | 3.50 | 1.84666 | 23.8 | 32.07 |
| 10 | — | (Variable) | | | 32.27 |
| 11 | 142.944 | 5.46 | 1.43387 | 95.1 | 32.75 |
| 12 | −58.692 | 0.32 | | | 32.94 |
| 13 | 83.717 | 5.49 | 1.51742 | 52.4 | 32.39 |
| 14 | −63.695 | 1.60 | 2.00100 | 29.1 | 31.98 |
| 15 | −201.790 | (Variable) | | | 31.87 |
| 16 (Stop) | ∞ | (Variable) | | | 27.93 |
| 17 | −50.156 | 1.40 | 1.60342 | 38.0 | 26.57 |
| 18 | 43.858 | 3.85 | 1.78472 | 25.7 | 27.15 |
| 19 | −782.497 | (Variable) | | | 27.20 |
| 20 | −270.749 | 2.97 | 1.77250 | 49.6 | 27.94 |
| 21 | −57.597 | 0.15 | | | 28.04 |
| 22 | 61.827 | 5.55 | 1.48749 | 70.2 | 27.09 |
| 23 | −45.828 | 1.40 | 1.84666 | 23.8 | 26.48 |
| 24 | −266.342 | 0.15 | | | 26.17 |

-continued

Unit mm

| | | | | | |
|---|---|---|---|---|---|
| 25 | 54.133 | 3.00 | 1.69680 | 55.5 | 25.67 |
| 26 | 232.583 | (Variable) | | | 25.17 |
| 27 | 110.250 | 1.10 | 1.77250 | 49.6 | 22.33 |
| 28 | 27.023 | 2.97 | | | 21.46 |
| 29 | −127.308 | 2.42 | 1.80518 | 25.4 | 21.49 |
| 30 | −40.781 | 2.32 | | | 21.76 |
| 31 | −39.938 | 1.10 | 1.77250 | 49.6 | 21.58 |
| 32 | 56.225 | 6.03 | | | 22.34 |
| 33 | 53.482 | 4.40 | 1.61340 | 44.3 | 27.43 |
| 34 | −522.553 | (Variable) | | | 27.97 |
| 35 | 86.090 | 4.32 | 1.54072 | 47.2 | 34.31 |
| 36 | −200.000 | 1.50 | 1.63854 | 55.4 | 34.38 |
| 37 | 216.296 | | | | 34.53 |

Various data
Zoom ratio 3.78

| | Wide angle | Intermediate | Telephoto |
|---|---|---|---|
| Focal length | 102.79 | 199.98 | 389.04 |
| F number | 4.63 | 5.06 | 5.86 |
| Half field angle (degrees) | 11.89 | 6.17 | 3.18 |
| Image height | 21.64 | 21.64 | 21.64 |
| Total lens length | 229.73 | 280.68 | 301.71 |
| BF | 48.29 | 48.29 | 48.29 |
| d 5 | 4.00 | 54.96 | 76.00 |
| d10 | 29.67 | 21.98 | 1.14 |
| d15 | 1.52 | 4.01 | 16.06 |
| d16 | 8.40 | 21.20 | 36.39 |
| d19 | 22.35 | 14.75 | 8.36 |
| d26 | 12.41 | 7.98 | 1.20 |
| d34 | 10.65 | 15.08 | 21.86 |

Zoom lens unit data

| Unit | First surface | Focal length | Lens structure length | Front principal point position | Rear principal point position |
|---|---|---|---|---|---|
| 1 | 1 | 179.00 | 23.88 | −0.74 | −16.91 |
| 2 | 6 | −51.84 | 11.03 | 2.71 | −5.30 |
| 3 | 11 | 71.65 | 12.87 | 2.70 | −5.86 |
| 4 | 17 | −146.56 | 5.25 | −0.97 | −4.02 |
| 5 | 20 | 42.71 | 13.23 | 3.06 | −5.24 |
| 6 | 27 | −38.70 | 20.35 | −0.16 | −18.09 |
| 7 | 35 | 342.95 | 5.82 | −4.23 | −7.86 |

Numerical Example 4

Unit mm

Surface data

| Surface number | r | d | nd | vd | Effective diameter |
|---|---|---|---|---|---|
| 1 | 114.736 | 7.77 | 1.48749 | 70.2 | 71.57 |
| 2 | 1355.258 | 0.22 | | | 70.83 |
| 3 | 97.981 | 3.50 | 1.65412 | 39.7 | 68.35 |
| 4 | 53.572 | 11.49 | 1.49700 | 81.5 | 64.22 |
| 5 | 262.432 | (Variable) | | | 63.16 |
| 6 | 96.576 | 1.60 | 1.77250 | 49.6 | 30.81 |
| 7 | 47.505 | 16.67 | | | 29.36 |
| 8 | −61.975 | 1.60 | 1.69680 | 55.5 | 26.57 |
| 9 | 48.083 | 3.73 | 1.84666 | 23.8 | 27.01 |
| 10 | 292.065 | (Variable) | | | 27.08 |
| 11 | 252.575 | 5.42 | 1.43387 | 95.1 | 27.53 |
| 12 | −38.467 | 0.15 | | | 27.69 |
| 13 | 494.813 | 4.58 | 1.51742 | 52.4 | 26.96 |
| 14 | −36.452 | 1.60 | 2.00100 | 29.1 | 26.62 |

-continued

Unit mm

| | | | | | |
|---|---|---|---|---|---|
| 15 | −79.642 | (Variable) | | | 26.78 |
| 16 (Stop) | ∞ | (Variable) | | | 24.26 |
| 17 | −30.251 | 1.40 | 1.60342 | 38.0 | 23.59 |
| 18 | 57.885 | 4.03 | 1.78472 | 25.7 | 24.86 |
| 19 | −72.580 | 18.30 | | | 25.14 |
| 20 | −76.899 | 2.70 | 1.77250 | 49.6 | 25.83 |
| 21 | −39.840 | 0.15 | | | 26.10 |
| 22 | 122.835 | 5.12 | 1.48749 | 70.2 | 25.38 |
| 23 | −33.956 | 1.40 | 1.84666 | 23.8 | 24.90 |
| 24 | −98.490 | 0.15 | | | 24.82 |
| 25 | 67.381 | 2.96 | 1.69680 | 55.5 | 24.28 |
| 26 | −1210.507 | (Variable) | | | 24.01 |
| 27 | 58.845 | 1.10 | 1.77250 | 49.6 | 22.21 |
| 28 | 24.622 | 3.17 | | | 21.33 |
| 29 | −126.159 | 2.38 | 1.80518 | 25.4 | 21.38 |
| 30 | −41.139 | 1.28 | | | 21.61 |
| 31 | −38.539 | 1.10 | 1.77250 | 49.6 | 21.46 |
| 32 | 66.873 | 9.29 | | | 22.09 |
| 33 | 53.721 | 3.87 | 1.61340 | 44.3 | 28.44 |
| 34 | −530.855 | | | | 28.70 |

Various data
Zoom ratio 3.78

| | Wide angle | Intermediate | Telephoto |
|---|---|---|---|
| Focal length | 102.76 | 199.93 | 388.91 |
| F number | 5.11 | 5.20 | 5.86 |
| Half field angle (degrees) | 11.89 | 6.18 | 3.18 |
| Image height | 21.64 | 21.64 | 21.64 |
| Total lens length | 229.72 | 273.73 | 301.72 |
| BF | 62.38 | 65.52 | 76.03 |
| d 5 | 4.00 | 48.01 | 76.00 |
| d10 | 25.60 | 12.22 | 3.13 |
| d15 | 1.02 | 9.20 | 9.49 |
| d16 | 5.13 | 10.33 | 19.13 |
| d26 | 14.86 | 11.70 | 1.20 |

Zoom lens unit data

| Unit | First surface | Focal length | Lens structure length | Front principal point position | Rear principal point position |
|---|---|---|---|---|---|
| 1 | 1 | 168.89 | 22.98 | −2.70 | −17.49 |
| 2 | 6 | −48.34 | 23.61 | 10.52 | −8.85 |
| 3 | 11 | 75.27 | 11.74 | 3.95 | −3.88 |
| 4 | 17 | 48.10 | 36.22 | 28.49 | 5.11 |
| 5 | 27 | −50.86 | 22.19 | −3.76 | −25.74 |

TABLE 1

| Parameter | Example 1 | Example 2 | Example 3 | Example 4 |
|---|---|---|---|---|
| | Lens unit type | | | |
| | Positive negative positive negative positive negative | Positive negative positive negative positive negative | Positive negative positive negative positive negative positive | Positive negative positive negative positive negative |
| f1 | 176.336 | 194.145 | 178.998 | 168.893 |
| f2 | −52.379 | −55.243 | −51.844 | −48.344 |
| fN − 1 | 43.067 | 43.668 | 42.713 | 48.099 |
| fN | −47.746 | −45.806 | −38.703 | −50.862 |
| o1N | −4.311 | −1.993 | −0.164 | −3.759 |
| dN | 20.291 | 18.754 | 20.354 | 22.187 |
| d34 | 6.497 | 4.300 | 6.033 | 9.292 |
| LN | 96.312 | 94.630 | 96.313 | 98.213 |
| DT(5fT) | 8.922 | 9.090 | 8.920 | 9.097 |

TABLE 1-continued

| Parameter | | Example 1 | Example 2 | Example 3 | Example 4 |
|---|---|---|---|---|---|
| | | Lens unit type | | | |
| fW | | 102.788 | 102.786 | 102.790 | 102.760 |
| fT | | 389.033 | 389.026 | 389.040 | 388.913 |
| Shortest photographing distance Xmin | | 1000.000 | 1000.000 | 1000.000 | 1000.000 |
| DT(Xmin) | | 16.980 | 16.753 | 16.698 | 16.701 |
| Conditional Expression (1) | fN/fT | −0.123 | −0.118 | −0.099 | −0.131 |
| Conditional Expression (2) | o1N/dN | −0.212 | −0.106 | −0.008 | −0.169 |
| Conditional Expression (3) | LN/fT | 0.248 | 0.243 | 0.248 | 0.253 |
| Conditional Expression (4) | d34/dN | 0.320 | 0.229 | 0.296 | 0.419 |
| Conditional Expression (5) | fN − 1/fT | 0.111 | 0.112 | 0.110 | 0.124 |
| Conditional Expression (6) | DT (5fT)/fT | 0.023 | 0.023 | 0.023 | 0.023 |
| Conditional Expression (7) | f1/fT | 0.453 | 0.499 | 0.460 | 0.434 |
| Conditional Expression (8) | f2/fT | −0.135 | −0.142 | −0.133 | −0.124 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-241733, filed Nov. 22, 2013, which is hereby incorporated by reference herein in its entirety.

What is claimed is:

1. A zoom lens, comprising, in order from an object side to an image side:
    a first lens unit having a positive refractive power;
    a second lens unit having a negative refractive power; and
    three or more lens units,
    wherein an interval between adjacent ones of the lens units is changed during zooming,
    wherein an N-th lens unit, where 5<N holds, counted from the object side has a negative refractive power, and is configured to move to the image side during focusing from an infinite object distance to a close object distance, the N-th lens unit comprising, in order from the object side to the image side, a negative lens, a positive lens, a negative lens, and a positive lens, and
    wherein the following conditional expressions are satisfied:

$$-0.15 < f_N/f_T < -0.05; \text{ and}$$

$$-0.30 < o_{1N}/d_N < 0.05,$$

where $f_N$ represents a focal length of the N-th lens unit, $f_T$ represents a focal length of an entire system at a telephoto end, $o_{1N}$ represents a distance from a surface vertex of a lens surface on the object side of a lens closest to the object side of the N-th lens unit to a front principal point position of the N-th lens unit, and $d_N$ represents a length on an optical axis of the N-th lens unit.

2. A zoom lens according to claim 1, wherein the following conditional expression is satisfied:

$$0.15 < L_N/f_T < 0.35,$$

where $L_N$ represents a distance from the surface vertex of a lens surface on the object side of a lens closest to the object side of the N-th lens unit to an image plane at the telephoto end.

3. A zoom lens according to claim 1, wherein the following conditional expression is satisfied:

$$0.15 < d_{34}/d_N < 0.60,$$

where $d_{34}$ represents an interval between a third lens counted from the object side of the N-th lens unit, and a fourth lens counted from the object side of the N-th lens unit.

4. A zoom lens according to claim 1, wherein an (N−1)th lens unit counted from the object side has a positive refractive power.

5. A zoom lens according to claim 4, wherein the following conditional expression is satisfied:

$$0.05 < f_{N-1}/f_T < 0.20,$$

where $f_{N-1}$ represents a focal length of the (N−1)th lens unit.

6. A zoom lens according to claim 1,
wherein the zoom lens is configured to focus on an object distance which is five times as large as the focal length of the entire system at the telephoto end, and
wherein the following conditional expression is satisfied:

$$0.015 < D_T(5f_T)/f_T < 0.030,$$

where $D_T(X)$ represents a movement amount of the N-th lens unit when focusing is carried out from the infinite object distance to an object distance X (mm) at the telephoto end.

7. A zoom lens according to claim 1, wherein at least one lens unit of a third lens unit counted from the object side to an (N−1)th lens unit counted from the object side is configured to move during the focusing.

8. A zoom lens according to claim 1, wherein an (N−2)th lens unit counted from the object side has a negative refractive power, and is configured to move to the object side during the focusing from the infinite object distance to the close object distance.

9. A zoom lens according to claim 1, wherein the following conditional expressions are satisfied:

$$0.35 < f_1/f_T < 0.60; \text{ and}$$

$$-0.20 < f_2/f_T < -0.10,$$

where $f_1$ represents a focal length of the first lens unit, and $f_2$ represents a focal length of the second lens unit.

10. A zoom lens according to claim 1, consisting of, in order from the object side to the image side:
the first lens unit having the positive refractive power;
the second lens unit having the negative refractive power;
a third lens unit having a positive refractive power;
a fourth lens unit having a negative refractive power;
a fifth lens unit having a positive refractive power; and
a sixth lens unit having a negative refractive power,
wherein the N-th lens unit corresponds to the sixth lens unit.

11. A zoom lens according to claim 1, consisting of, in order from the object side to the image side:
the first lens unit having the positive refractive power;
the second lens unit having the negative refractive power;
a third lens unit having a positive refractive power;
a fourth lens unit having a negative refractive power;
a fifth lens unit having a positive refractive power;
a sixth lens unit having a negative refractive power; and
a seventh lens unit having a positive refractive power,
wherein the N-th lens unit corresponds to the sixth lens unit.

12. A zoom lens according to claim 1, consisting of, in order from the object side to the image side:
the first lens unit having the positive refractive power;
the second lens unit having the negative refractive power;
a third lens unit having a positive refractive power;
a fourth lens unit having a positive refractive power; and
a fifth lens unit having a negative refractive power,
wherein the N-th lens unit corresponds to the fifth lens unit.

13. An image pickup apparatus, comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power; and
three or more lens units,
wherein an interval between adjacent ones of the lens units is changed during zooming,
wherein an N-th lens unit, where 5<N holds, counted from the object side has a negative refractive power, and is configured to move to the image side during focusing from an infinite object distance to a close object distance, the N-th lens unit comprising, in order from the object side to the image side, a negative lens, a positive lens, a negative lens, and a positive lens, and
wherein the following conditional expressions are satisfied:

$$-0.15 < f_N/f_T < -0.05; \text{ and}$$

$$-0.30 < o_{1N}/d_N < 0.05,$$

where $f_N$ represents a focal length of the N-th lens unit, $f_T$ represents a focal length of an entire system at a telephoto end, $o_{1N}$ represents a distance from a surface vertex of a lens surface on the object side of a lens closest to the object side of the N-th lens unit to a front principal point position of the N-th lens unit, and $d_N$ represents a length on an optical axis of the N-th lens unit.

* * * * *